United States Patent
Kohn

(10) Patent No.: US 7,543,055 B2
(45) Date of Patent: Jun. 2, 2009

(54) SERVICE PROVIDER BASED NETWORK THREAT PREVENTION

(75) Inventor: Richard T. Kohn, Orlando, FL (US)

(73) Assignee: Earthlink, Atlanta, GA (US)

( * ) Notice: Subject to any disclaimer, the term of this patent is extended or adjusted under 35 U.S.C. 154(b) by 591 days.

(21) Appl. No.: 11/425,229

(22) Filed: Jun. 20, 2006

(65) Prior Publication Data

US 2007/0294391 A1      Dec. 20, 2007

(51) Int. Cl.
*G06F 15/173* (2006.01)

(52) U.S. Cl. ............................. 709/224; 726/2; 713/155

(58) Field of Classification Search ................. 709/224; 726/2, 22, 23, 24, 25; 713/155
See application file for complete search history.

(56) References Cited

U.S. PATENT DOCUMENTS

| | | | |
|---|---|---|---|
| 6,957,348 B1 * | 10/2005 | Flowers et al. ................. | 726/23 |
| 7,313,691 B2 * | 12/2007 | Bantz et al. ................. | 713/155 |
| 7,458,094 B2 * | 11/2008 | Jackson .......................... | 726/2 |
| 7,475,425 B2 * | 1/2009 | Bantz et al. .................... | 726/22 |
| 2002/0093527 A1 * | 7/2002 | Sherlock et al. ............. | 345/736 |
| 2003/0051026 A1 * | 3/2003 | Carter et al. ................. | 709/224 |
| 2003/0097591 A1 * | 5/2003 | Pham et al. .................. | 713/201 |
| 2005/0044406 A1 * | 2/2005 | Stute .......................... | 713/201 |

* cited by examiner

*Primary Examiner*—Krisna Lim

(57) ABSTRACT

Systems and methods responsive to communicated network threats are disclosed. An example method includes assembling a collection of files, inserting a network traffic monitor that identifies a first domain responsible for communicating a known threat, searching for and classifying files not in the collection of files, and updating the collection of files when the classification indicates that the file not in the collection of files is a network threat. An embodiment of a system includes a network traffic monitor, a crawler, a data store, and an analyzer. The network traffic monitor identifies a first domain responsible for communicating a threat. The crawler traverses the first domain and additional domains linked via the first domain. In addition, the crawler identifies changed files. The data store holds a collection of files associated with known threats and files not associated with threats. The analyzer examines and classifies new files and changed files.

20 Claims, 6 Drawing Sheets

SERVICE PROVIDER BASED NETWORK THREAT PREVENTION

BACKGROUND

As the popularity of computer networks has grown, the proliferation of network threats has become more common. Network threats include computer viruses, spyware and malware. A common thread shared by these network threats is that a program or piece of code is loaded onto a computer without the full knowledge or consent of the computer operator.

A computer virus is a program or piece of code that replicates itself and typically tries to load itself in additional computers coupled to an "infected" computer. Spyware is any software that covertly gathers user information through the user's network connection without his or her knowledge, usually for advertising purposes. Spyware applications are typically bundled as a hidden component of freeware or shareware programs that can be downloaded. Once installed, the spyware monitors user activity and transmits that information in the background to someone else. Some spyware applications can be useful in that dedicated advertising can be pre-arranged and forwarded when a user returns to a particular network location. In other cases, personal and network information can be used to pre-load pages and other interfaces to enhance an operator's network experience. Other spyware applications can be observing operator inputs looking for personal information to exploit. Malware, or malicious software, refers to any software which causes damage to a single computer, server, or computer network.

One way in which a network threat proliferates is to load itself into a computer along with a World Wide Web page that a user of the computer has selected. A World Wide Web page or Web page is a hypertext markup language (HTML) document stored at a specified address on the Internet or an Intranet. Once the network threat has been loaded onto a network coupled computer, the threat can be activated any time thereafter.

To prevent the inadvertent proliferation of network threats, it is desirable to prevent computer users from loading Web pages that load files that include network threats. An effective way to do this is to prevent Web hosting services from linking to Web pages associated with the distribution of network threats. However, finding Web sites that contain infected Web pages and Web pages that link to infected Web pages is a difficult problem. Web pages containing links to infected Web pages are changed constantly by those trying to maximize the spread of the network threat while avoiding detection.

Furthermore, it can be difficult to determine which Web sites contain network threats. U.S. Patent Application Publication 2003/0097591 describes a method, system, and computer program product for protecting computer users from Web sites hosting computer viruses and for protecting Web hosting systems from hosting Web pages that contains links to computer viruses. A disclosed method includes receiving information identifying a Web page selected for access by a user, determining whether the Web page is hosted by a Web site that is included in a database of Web sites related to computer viruses, and allowing access to the Web page based on whether the Web page includes a link to a Web site that is included in the database.

The disclosed method is slow, does not address active threats, and is not focused on the sources of known threats. Accordingly, further improvements are desired.

SUMMARY

Systems and methods that focus on real-time network activity and that respond to file changes on network coupled domains known for proliferating network threats are invented and disclosed.

One embodiment of a method for identifying a network threat includes the following steps: assembling a set of names of files responsible for proliferating a network threat and a set of names of files previously identified as not responsible for proliferating a network threat, inserting a network traffic monitor within a network service provider's infrastructure, the network traffic monitor configured to identify a first domain responsible for presently communicating at least one file from the set of names of files responsible for proliferating a network threat, searching the first domain for files not associated with either of the set of names of files responsible for proliferating a network threat and the set of names of files previously identified as not responsible for proliferating a network threat, analyzing the content of the files not associated with either of the set of names of files responsible for proliferating a network threat and the set of names of files previously identified as not responsible for proliferating a network threat and adding a file name to one of the set of names of files responsible for proliferating a network threat and the set of names of files previously identified as not responsible for proliferating a network threat responsive to the step of analyzing.

An embodiment of a system for identifying a network threat includes a network traffic monitor, a crawler, a data store and an analyzer. The network traffic monitor receives a copy of traffic that traverses a network service provider's infrastructure to identify a first domain responsible for communicating previously identified network threats. The crawler is coupled to the network traffic monitor. The crawler traverses the first domain by following links on pages presented by the first domain to identify a new file that is not a member of a set of previously identified files that proliferate threats and not a member of a set of previously identified files that do not proliferate threats. The data store is coupled to the network traffic monitor and the crawler. The data store holds a collection of files including the set of previously identified files that proliferated threats and a set of previously identified files that did not proliferate known threats, the new file, and an identifier associated with each of the first domain and the second domain. The analyzer is also coupled to the data store. The analyzer examines the execution behavior of the new file and in response thereto classifies and returns the new file to be stored in the data store along with one of the set of files that do not proliferate threats or the set of files that proliferate threats.

Other devices, methods, features and advantages will be or will become apparent to one with skill in the art upon examination of the following figures and detailed description. All such additional devices, methods, features and advantages are defined and protected by the accompanying claims.

BRIEF DESCRIPTION OF THE DRAWINGS

The present systems and methods for identifying and preventing network threats, as defined in the claims, can be better understood with reference to the following drawings. The components within the drawings are not necessarily to scale relative to each other; emphasis instead is placed upon clearly illustrating the elements, features and principles involved in identifying network threats.

DETAILED DESCRIPTION

Systems and methods responsive to communicated network threats are disclosed. As described above, network threats include computer viruses, spyware and malware. A set of files previously identified with known network threats is used in conjunction with real-time monitoring of data traffic through a service provider's network interface to identify network threats that are presently being communicated to unsuspecting clients. The domain responsible for sending the communication with the previously identified network threat is identified and examined for possible new threats. The examination process includes identifying all links and embedded files exposed on the domain. Files not previously identified and classified as a known network threat or no threat are fingerprinted and stored for offline analysis of the execution behavior of the file content. Files that do not exhibit one or more actions consistent with network threats are classified as no threats. Files that exhibit one or more actions consistent with network threats are classified as a known threat. Newly identified network threats are communicated to a threat analysis team that prioritizes service provider resources in generating a suitable response to prevent the proliferation of the network threat. Periodically, the new files and classifications are added to a network traffic monitor. Identified links are stored and later examined to identify both additional links and other new files to be examined.

In addition to the above-described process, file content of identified files is fingerprinted and periodically reexamined to determine when a file stored on a domain responsible for communicating network threats has changed. Files determined to have changed are analyzed to determine if the execution behavior is indicative of a new network threat.

Figure 1:
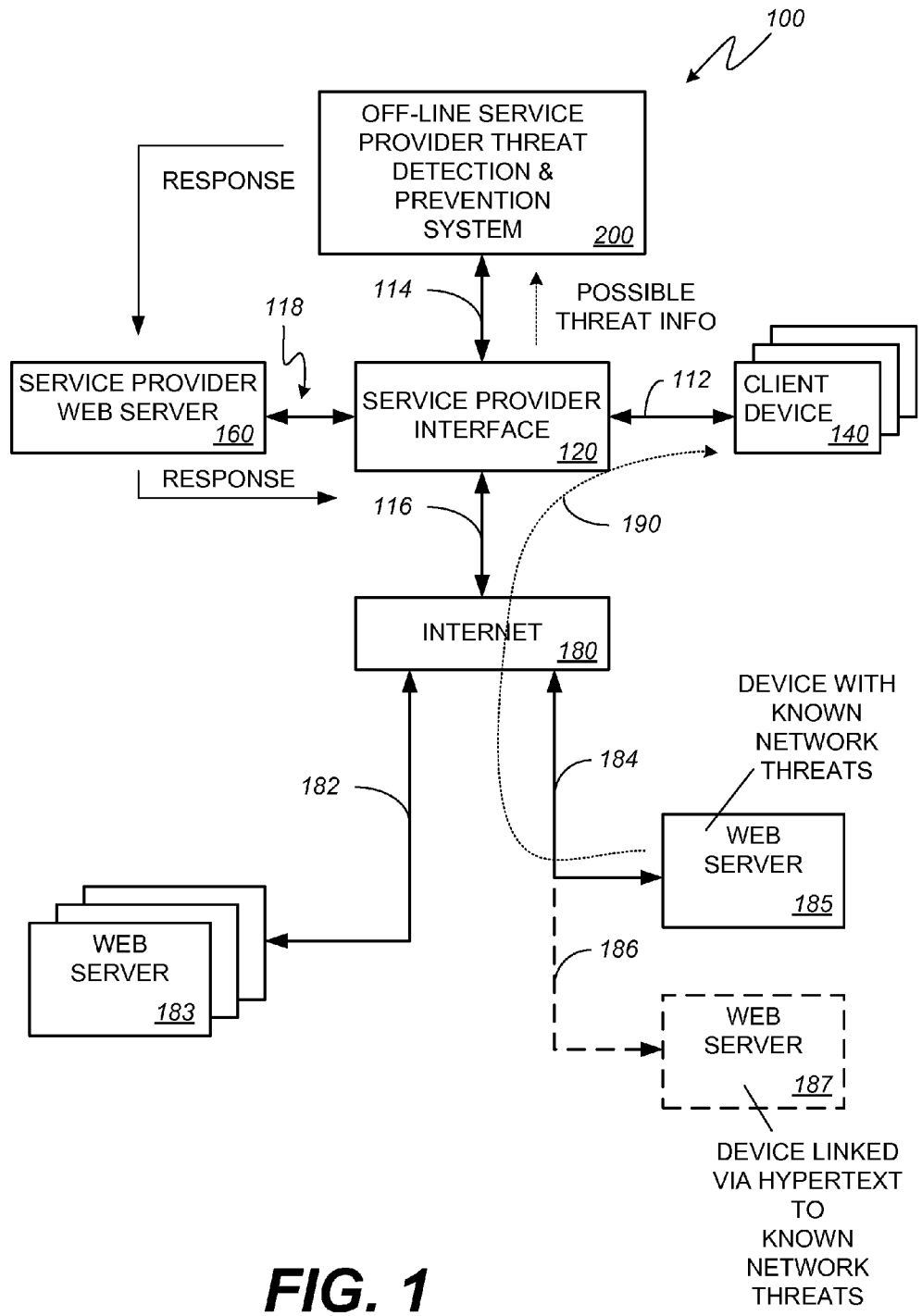
FIG. 1 is a functional block diagram illustrating an embodiment of a network environment.

Having generally described the operation of the systems and methods for service provider based network threat identification and prevention; various additional embodiments will be described with respect to FIGS. 1-6. FIG. 1 is a functional block diagram illustrating an embodiment of a network environment 100. Network environment 100 includes Internet 180 and a host of coupled computing devices such as, web server 183, web server 185 and web server 187. Internet 180 is a communications network that connects computer networks and organizational computer facilities around the world. The World Wide Web or web is a portion of the Internet comprised of a constellation of networked resources linked together; users can travel from one site to another by clicking on hyperlinks provided on a web page or site. Web servers utilize hypertext transfer protocol (HTTP) to transfer documents and multimedia files formatted in hypertext markup language (HTML). Not all servers on the Internet are part of the web. In the illustrated embodiment, web server 183 is coupled to Internet 180 via link 182; web server 185 is coupled to Internet 180 via link 184; and web server 187 is coupled Internet 180 via link 186. Web server 187 and link 186 are illustrated with dashed lines to indicate that content on web server 185 is linked via a hypertext link to content on web server 187.

Service provider interface 120 exposes client device(s) 140 to web server 183, web server 185 and web server 187 via link 116 and Internet 180. Service provider interface 120 further exposes client device 140 to service provider resources stored within service provider web server 160 via link 118. Service provider interface 120 includes a host of dedicated communication devices that enable bi-directional communications. In the illustrated embodiment, client device 140 is coupled to service provider interface via link 112.

In addition to the above-described connectivity and devices, which generally provide Internet access and other services to subscribers of the service provider, network environment 100 includes off-line threat detection and prevention system 200, which is coupled to service provider interface 120 via link 114. Off-line threat detection and prevention system 200 is responsive to a communication such as communication 190, which traverses the service provider interface 120 on its way from a web server 185 previously identified as a source responsible for communicating a network threat to client device 140. When a new threat is identified by the off-line threat detection and prevention system 200, a suitable response is generated and communicated to service provider web server 160 and service provider interface 120 as desired.

Figure 2:
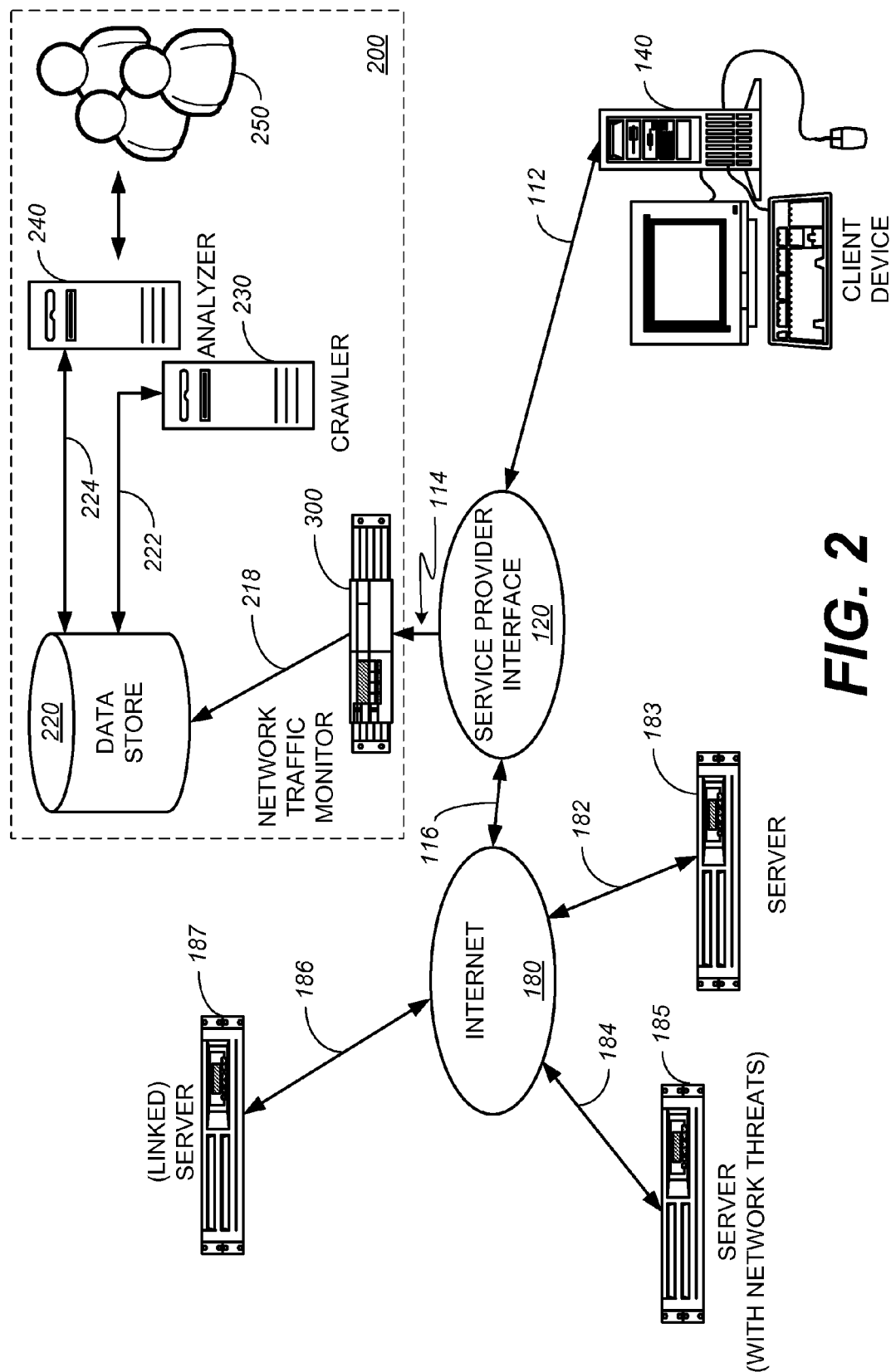
FIG. 2 is a functional block diagram of an embodiment of a network threat prevention system that can be integrated with the network environment of FIG. 1.

FIG. 2 is a functional block diagram of an embodiment of the off-line threat detection and prevention system 200 of FIG. 1. Off-line threat detection and prevention system 200 includes network traffic monitor 300, data store 220, crawler 230 and analyzer 240. Network traffic monitor 300 receives a copy of network data that is presently being communicated from the Internet 180 to client device 140 via the service provider interface 120. Network traffic monitor 300 forwards resource information (i.e., a uniform resource locator (URL) or domain name) as well as file information for select files not previously identified and classified. Data store 220 receives file and resource information from network traffic monitor 300 via link 218. Crawler 230, which may include a host of coordinated computing devices, is coupled to data store 220 via link 222. Crawler 230, in response to resource information provided by data store 220, searches the identified domain for links to one or more additional domains supported by web servers coupled to Internet 180. Crawler 230 returns URLs of additional domains linked to a first domain of interest to data store 220 so that these additional domains can be further searched for hypertext links. In addition, crawler 230 is configured to identify files that have not previously been classified as responsible for known threats or classified as not responsible for a known threat. Analyzer 240, which may include a host of coordinated computing devices, is coupled to data store 220 via link 224. Analyzer 240, in response to file information provided by data store 220, examines the execution behavior of file content to identify new network threats. Analyzer 240 classifies each examined file and returns a classification and file name to data store 220 to update file information stored within network traffic monitor 300. Analyzer 240 communicates file information and discovered execution behaviors to threat prevention team 250. The threat prevention team 250 updates analyzer 240 in accordance with newly discovered execution behaviors that could be used to exploit client devices and/or personal information. In addition, threat prevention team 250 may forward information related to a prevention mechanism or other response to an identified network threat.

Figure 3:
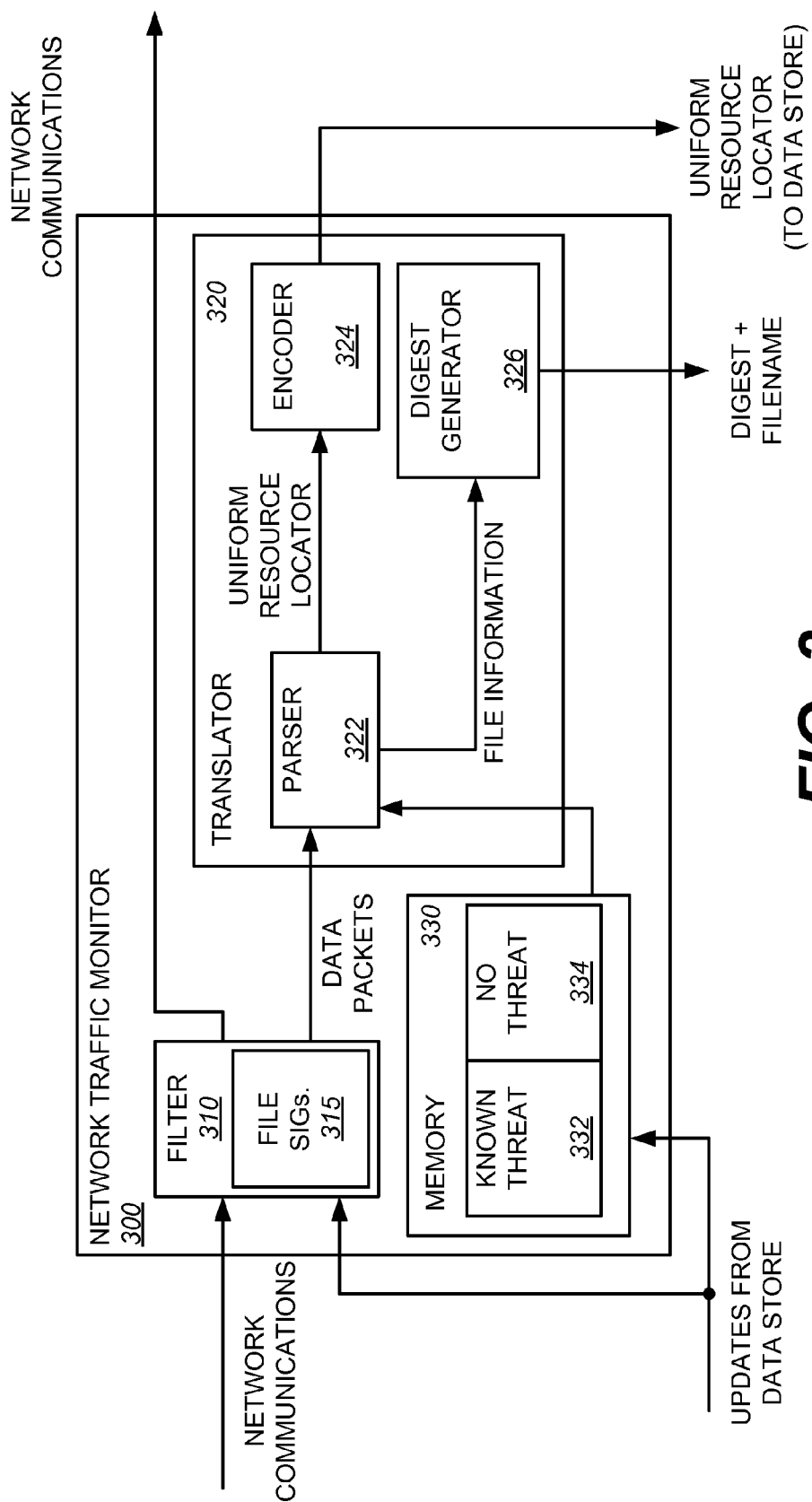
FIG. 3 is a functional block diagram of the network traffic monitor of FIG. 2.

FIG. 3 is a functional block diagram illustrating an embodiment of the network traffic monitor 300 of FIG. 2. Network traffic monitor 300 receives network communications and depending on information therein, either forwards the network communications unchanged to their intended destination(s) or if the network communication contains information from one or more URLs known to have proliferated network threats in the past, the network traffic monitor 300 identifies and forwards the URL to data store 220. In addition, network traffic monitor 300 forwards a digest and a file name to data store 220 when a file is identified in the network traffic that is not already present in one or both of the set of files identified as responsible for proliferating known threats or the set of files identified as no threat to network coupled resources.

As illustrated in FIG. 3, network traffic tool 300 includes filter 310, translator 320 and memory 330. Known threat store 332 includes storage locations for the name and URL of files that have been previously identified as containing or otherwise responsible for the proliferation of network threats (i.e., a set of names of files previously identified as responsible for proliferating a network threat). No threat store 334 includes the name of files that have been previously identified as not containing or being otherwise responsible for the proliferation of a network threat (i.e., a set of names of files previously identified as not responsible for proliferating a network threat). As indicated in the illustrated embodiment, file information associated with known network threats and identified non-threats is pre-loaded from data store 220 (FIG. 2).

Filter 310 receives a copy of network communications that are presently being sent between network coupled servers and client computing devices coupled to the servers via the service provider. Filter 310 uses a set of file signatures 315 to determine when a client communication contains a known network threat. As indicated in FIG. 3, the file signatures 315 are periodically updated via information distributed from data store 220 (FIG. 2). When a present network communication to a client computing device contains an identified file signature, the data packets containing the identified file signature are forwarded to translator 320 for further processing. Translator 320 includes parser 322, encoder 324 and digest generator 326. Parser 322 extracts information from data packets forwarded by filter 310. A first output includes the URL of the network coupled device responsible for generating the present data packet. The URL is forwarded to encoder 324, which buffers the URL for storage in data store 220. A second output from parser 322 includes file information for files that do not match the filenames in either of the sets of files stored in memory 330. The name and content within these newly discovered files is forwarded to digest generator 326. Thus, network traffic tool 300 is controllably responsive to both the source of the network communication, the sets of file information and the content associated with discovered or new files.

Digest generator 326, in accordance with a hashing algorithm, generates a fixed length fingerprint that uniquely identifies the file. In a preferred embodiment, digest generator 326 is configured with the message digest 5 (MD5) algorithm, placed in the public domain by RSA Data Security, Inc. The MD5 algorithm translates an arbitrary length input and produces a 128-bit fingerprint or message digest of the input. Any modifications made to the input can be detected by recalculating the digest and comparing the original digest to the recalculated or subsequent digest.

Figure 4:
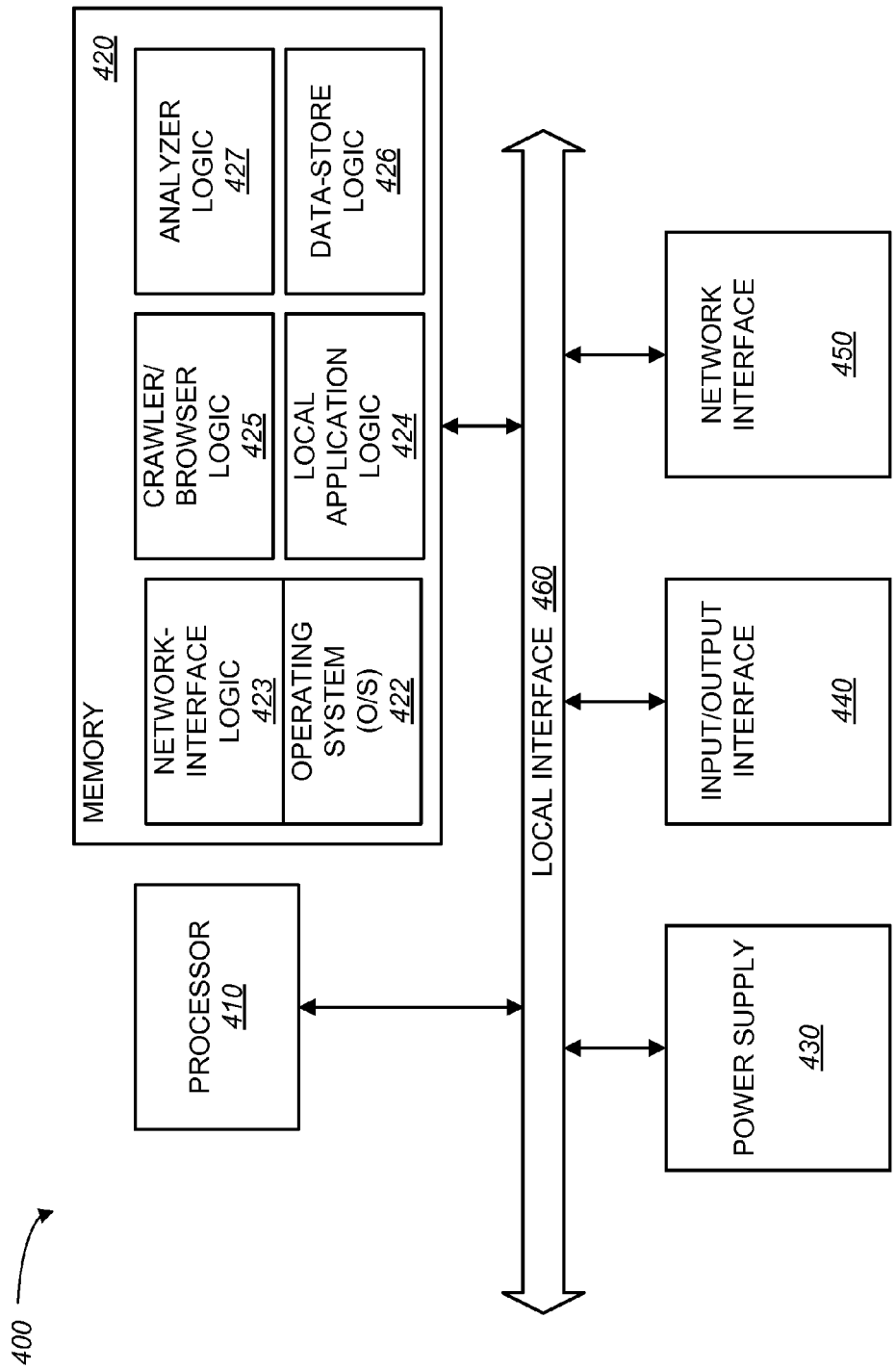
FIG. 4 is a functional block diagram of an embodiment of a computing device coupled to logic that when executed performs the functions associated with the crawler and/or the analyzer.

FIG. 4 is a functional block diagram of an embodiment of a computing device 400 coupled to logic that when executed performs the functions associated with crawler 230 and/or analyzer 240. Generally, in terms of hardware architecture, as shown in FIG. 4, computing device 400 includes processor 410, memory 420, power supply 430, input/output (I/O) interface 440 and network interface 450. Processor 410, memory 420, power supply 430, I/O interface 440 and network interface 450 are communicatively coupled via local interface 460. The local interface 460 can be, for example but not limited to, one or more buses or other wired or wireless connections, as is known in the art. The local interface 460 may have additional elements, which are omitted for simplicity, such as controllers, buffers (caches), drivers, repeaters, and receivers, to enable communications. Further, the local interface 460 may include address, control, power and/or data connections to enable appropriate communications among the aforementioned components.

Power supply 430 provides power to each of the processor 410, memory 420, I/O interface 440, network interface 450 and local interface 460 in a manner understood by one of ordinary skill in the art.

Processor 410 is a hardware device for executing software, particularly that stored in memory 420. The processor 410 can be any custom made or commercially available processor, a central processing unit (CPU), an auxiliary processor among several processors associated with the computing device 400, a semiconductor based microprocessor (in the form of a microchip or chip set), or generally any device for executing software instructions.

The memory 420 can include any one or combination of volatile memory elements (e.g., random-access memory (RAM), such as dynamic random-access memory (DRAM), static random-access memory (SRAM), synchronous dynamic random-access memory (SDRAM), etc.) and non-volatile memory elements (e.g., read-only memory (ROM), hard drive, tape, compact disk read-only memory (CD-ROM), etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in memory 420 may include one or more separate programs, each of which comprises an ordered listing of executable instructions for implementing logical functions. In the example of FIG. 4, the software in the memory 420 includes operating system 422, network-interface logic 423, local application logic 424, crawler/browser logic 425, data-store logic 426, and analyzer logic 427. The operating system 422 essentially controls the execution of other computer programs, such as network-interface logic 423, local application logic 424, crawler/browser logic 425, data-store logic 426, and analyzer logic 427 and provides scheduling, input-output control, file and data management, memory management, communication control and related services.

Network-interface logic 423 comprises one or more programs and one or more data elements that enable the computing device 400 to communicate with external devices via network interface 450. In this regard, network-interface logic 423 may include one or more buffers and parameter stores for holding configuration information and or data as may be required.

Local application logic 424 comprises one or more programs and one or more data elements that enable the computing device 400 to generate, store and communicate text, image, audio and video information with external devices including data store 220 via network interface 450. In this regard, local application logic 424 may include one or more buffers and parameter stores for holding configuration information and or data as may be required.

Crawler/browser logic 425 comprises one or more programs and one or more data elements that enable the computing device 400 to communicate with external servers via hypertext mark-up language pages or frames communicated via network interface 450. When executed, crawler/browser logic 425 directs computing device 400 to browse an identified domain on a network coupled computing device (e.g., Web pages available via a URL) in an automated methodical manner. Crawler/browser logic 425 forwards all links identified while browsing a present domain of interest to data store 220. Forwarded links include links within the present domain of interest and links to other domains. Data store 220 holds the URL of each additional linked domain until crawler/browser logic 425 searches each domain for additional links. Crawler/browser logic 425 further identifies files that are not listed in a present list of known files that include network threats. Each of these newly identified files is retrieved and forwarded along with the URL where the "suspicious" file was located to data store 220.

Crawler/browser logic 425 is also configured to periodically compare an original digest associated with each file available via a domain of interest with a subsequently generated digest. An original digest is created by executing a hashing algorithm on the contents of a select file. A subsequent digest is created at a select time thereafter by executing the same hashing algorithm on the contents of a file with the same name. The original digest and subsequent digest will be identical when the contents of the select file have not changed. The original digest and subsequent digest will not be identical when the contents of the select file have changed. Thus, a comparison of the original and subsequent digests identifies files that may have been modified to include a new network threat. Such files, once identified by crawler/browser logic 425 are forwarded to data store 220 for later analysis and classification.

To implement the above described functions, crawler/browser logic 425 may include one or buffers and parameter stores for holding configuration information and or data as may be required. In some embodiments, crawler/browser logic 425 may include one or more add-on programs including toolbars, extensions, helper objects, etc. to expose image, audio, and video information available via an examined domain of interest. These add-on programs may be used to expose hidden files that are transferred along with image, audio and video information to unsuspecting clients of the service provider.

Data-store logic 426 comprises one or more programs and one or more data elements that enable the computing device 400 to store, edit and delete information in data store 220. In some embodiments, data-store logic 426 is a commercially available database product that includes one or more buffers and parameter stores for holding configuration information as may be required.

Analyzer logic 427 comprises one or more programs and one or more data elements that enable the computing device 400 to examine the execution behavior of files available from data store 220. When the execution behavior of a select file of interest performs one or more actions exhibited in known network threats, analyzer logic 427 associates a tag identifying the select file as a known network threat. When the execution behavior of a select file of interest performs one or more actions not exhibited in a known network threat but questionable in nature (e.g., attempting to modify configuration information on a computing device such as basic input/output system (BIOS) parameters, attempting to manipulate software configuration items on a hard-disk drive without notifying the operator, etc.) the select file of interest is associated with a tag identifying the file as an unknown threat. These files may be forwarded electronically or their execution behavior reported by other means to threat analysis team 250 for further evaluation and development of a suitable response. When the execution behavior of a select file of interest performs no action indicative of a network threat or questionable in nature, analyzer logic 427 associates a tag identifying the file as no threat. Each of the above described tags and the corresponding file names are communicated to data store 220 for periodically updating file sets stored in network traffic monitor 300.

Network-interface logic 423, local application logic 424, crawler/browser logic 425, data-store logic 426, and analyzer logic 427 are source programs, executable programs (object code), scripts, or other entities that include a set of instructions to be performed. When implemented as source programs, the programs are translated via a compiler, assembler, interpreter, or the like, which may or may not be included within memory 420, to operate properly in connection with the O/S 422.

I/O interface 440 includes multiple mechanisms configured to transmit and receive information via computing device 400. These mechanisms include serial, parallel, analog and digital video data protocols and the like. I/O interface 440 can be configured to use any device configured to receive and transmit audio, video, text, symbols and other information. Accordingly, computing device 400 can be integrated with a microphone, a camera, a video camera, a keyboard, a display and a human-to-machine interface associated with a personal digital assistant or other portable communication devices. Such human-to-machine interfaces may include touch sensitive displays or the combination of a graphical-user interface and a controllable pointing device such as a mouse.

Network interface 450 enables computing device 400 to communicate with various network coupled devices, including data store 220 and other service provider devices as well as various third-party provided Web servers. Network interface 450 performs the signal conditioning and format conversions to communicate data through the service provider's network infrastructure (including off-line systems) and accessible servers coupled to via the Internet. Preferably, network interface 450 is compatible with the 1000BaseT or Gigabit Ethernet standard and the TCP/IP protocol. It should be understood that other data-network interfaces compatible with other hardware and software standards and protocols may also be used including wireless communication protocols.

When computing device 400 is in operation, the processor 410 is configured to execute software stored within the memory 420, to communicate data to and from the memory 420, and to generally control operations of the computing device 400 pursuant to the software. The network-interface logic 423, local application logic 424, crawler/browser logic 425, data-store logic 426, analyzer logic 427 and the O/S 422, in whole or in part, but typically the latter, are read by the processor 410, perhaps buffered within the processor 410, and then executed.

When the network-interface logic 423, local application logic 424, crawler/browser logic 425, data-store logic 426, and analyzer logic 427 are implemented in software, as is shown in FIG. 4, it should be noted that these software elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where one or more of the network-interface logic 423, local application logic 424, crawler/browser logic 425, data-store logic 426, and analyzer logic 427 are implemented in hardware, the network-interface logic 423, local application logic 424, crawler/browser logic 425, data-store logic 426, and analyzer logic 427 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), etc.

It should be understood that the computing device 400 as presented in FIG. 4 and described above represents one embodiment of a computing device that when properly configured can practice the following described methods of identifying and preventing network threats. Alternative embodiments are possible. In an exemplary arrangement, data store 220, crawler 230 and analyzer 240 are separate and distinct devices. In still other embodiments, including a preferred embodiment, crawler/browser logic 425 is distributed across multiple computing devices or crawlers configured to controllably search the contents of domains received from data store 220. Similarly, analyzer 240, including analyzer logic 427 may be distributed across multiple computing devices or analyzers.

Figure 5:
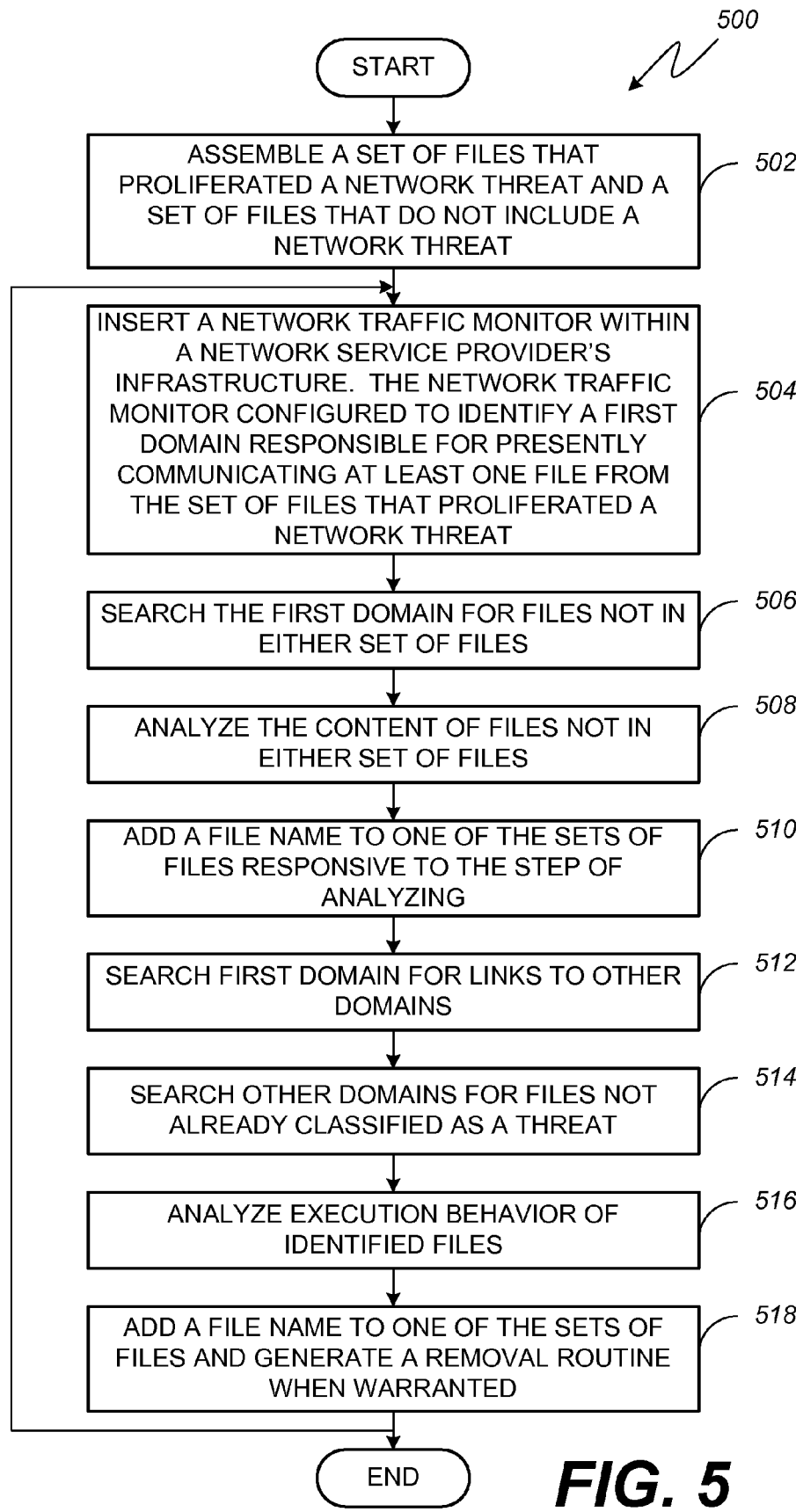
FIG. 5 is a flow diagram illustrating an embodiment of a method for identifying and responding to network threats.

FIG. 5 is a flow diagram illustrating an embodiment of a method for identifying and responding to network threats. The flow diagram of FIG. 5 shows the architecture, functionality, and operation of a possible implementation via software and or firmware associated with communicatively coupled devices that enable a service provider to respond to communicated network threats. In this regard, each block represents a module, segment, or portion of code, which comprises one or more executable instructions for implementing the specified function(s).

Method 500 begins with block 502 where a service provider assembles a set of files responsible for the proliferation of a network threat and a second set of files that do not include content associated with a network threat. As indicated in block 504, the service provider inserts a network traffic monitor within the service provider's infrastructure. The network traffic monitor receives a copy of network communications and identifies a domain responsible for presently communicating a file from the set of files responsible for the proliferation of a network threat. As shown in block 506, the service provider searches the first domain for files not in either set of files. Thereafter, as shown in block 508, the service provider analyzes the content of files not in either set of files. In block 510, the service provider adds a file name to one of the sets of files based on the results of the file content analysis.

Thereafter, or substantially concurrently with the functions described in blocks 506, 508 and 510, the service provider searches the contents of the first domain for links to other domains as indicated in block 512. Other domains identified in block 512 may be stored to later search or crawl other domains for files not previously identified as known for proliferating network threats) as indicated in block 514. In block 516, the service provider analyzes the execution behavior of newly identified files. In block 518, the service provider adds a file name(s) to one of the sets of files and generates a removal routine or other response when warranted. As further illustrated in FIG. 5, the functions associated with blocks 504 through 518 may be repeated as desired.

Figure 6:
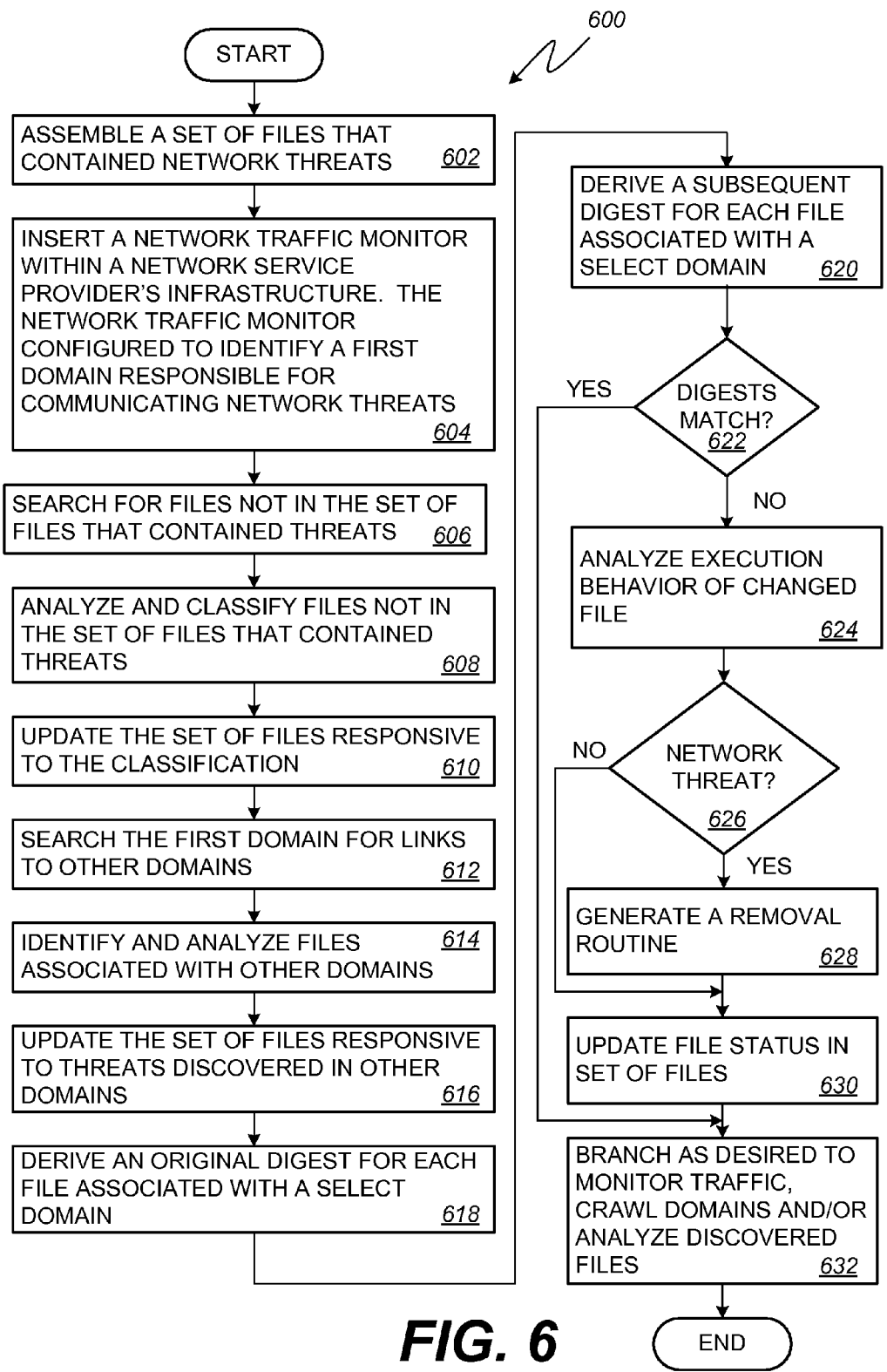
FIG. 6 is a flow diagram illustrating an alternative embodiment of a method for identifying and preventing network threats.

FIG. 6 is a flow diagram illustrating an alternative embodiment of a method for identifying and preventing network threats. The flow diagram of FIG. 6 shows the architecture, functionality, and operation of a possible implementation via software and or firmware associated with communicatively coupled devices that identify and respond to presently communicated network threats. In this regard, each block represents a module, segment, or portion of code, which comprises one or more executable instructions for implementing the specified function(s).

Method 600 begins with block 602 where a service provider assembles a set of files known for proliferating network threats. As indicated in block 604, the service provider inserts a network traffic monitor with the service provider's infrastructure. The network traffic monitor performs a host of functions as described above. As shown in block 606, the service provider searches the first domain for new files. New files include files not in the set of files known for proliferating network threats. In some embodiments, new files also include files not in the set of files known for not proliferating network threats. Thereafter, as shown in block 608, the service provider analyzes and classifies the new files. Analysis of new files includes a first screening process that examines the execution behavior of the content of each of the files. When the execution behavior includes actions commonly associated with network threats (e.g., replicating code, modifying system configuration items, avoiding detection, among others) the service provider associates a tag titled "known threat" with the file. When the execution behavior does not include actions associated with network threats, the service provider associates a tag titled, "no threat" with the file. When the execution behavior includes actions that are suspect, the service provider may associate a third tag titled "unknown" with the file. As described above, files with the tag "unknown" may be forwarded to a threat analysis team for further examination. As further indicated in block 610, the service provider updates the sets of files in accordance with the classification or tag associated with each new file.

Thereafter, or substantially concurrently with the functions described in block 608, the service provider searches the contents of the first domain for links to other domains as indicated in block 612. Other domains identified in block 612 may be stored to later identify and analyze new files on the other domains (files not previously identified as known for proliferating network threats) as indicated in block 614. In block 616, the service provider updates the set of files responsive to threats discovered in other domains.

Thereafter, or substantially concurrently with the functions described in blocks 608, 612, 614 and 616, the service provider derives or otherwise generates a digest for each file associated with a select domain as shown in block 618. Periodically thereafter, as shown in block 620, the service provider derives or otherwise generates a subsequent digest for each file on a select domain. In decision block 622, the service provider determines whether the original file digest matches the subsequent file digest. When it is determined that the original and subsequent file digests do not match (i.e., the associated file has been modified) as indicated by the flow control arrow labeled "NO" exiting decision block 622, processing continues with block 624 where the service provider analyzes the execution behavior of the changed file to determine if the file presents a network threat. If the modified file presents a network threat as indicated by the flow control arrow exiting decision block 626 labeled "YES," the service provider generates a removal routine or other suitable threat response as indicated in block 628. Otherwise, when it is determined that the modified file is not a network threat, as indicated by the flow control arrow labeled "NO" exiting decision block 626, processing continues with block 630 where the service provider updates status information in the set of files. As further shown in the flow diagram of FIG. 6, the service provider controllably branches to one or more functions as may be desired to monitor network traffic, crawl or search domains for new files and analyze newly discovered files (block 632). The service provider also controllably branches in the above described manner when the original and subsequent digests indicate that a previously known file has not changed, as indicated by the flow control arrow labeled "YES" exiting decision block 622.

As described above, the flow diagrams of FIGS. 5 and 6 show the architecture, functionality and operation of an implementation of example methods for identifying and responding to presently active threats communicated via a network. The described functions can be embodied in source code including human-readable statements written in a programming language or machine code that comprises instructions recognizable by a suitable execution system such as a processor in a computer system. The machine code may be converted from the source code, etc. If embodied in hardware, each block may represent a circuit or a number of interconnected circuits to implement the specified logical function(s).

While the flow diagrams of FIGS. 5 and 6 show specific sequences of execution, it will be appreciated that the functions associated with two or more blocks in the illustrated diagrams that are shown occurring in succession may be executed concurrently or with partial concurrence. In addition, any number of counters, state variables, warning semaphores, or messages might be added to the logical sequence described herein, for purposes of enhanced utility, performance measurement, troubleshooting, etc. All such variations are within the scope of the present systems and methods for identifying and preventing network threats.

The foregoing has been presented for purposes of illustration and description. It is not intended to be exhaustive or to limit the scope of the claims to the precise forms disclosed. Modifications or variations are possible in light of the above teachings. The embodiments discussed, however, were chosen and described to enable one of ordinary skill to utilize various embodiments of the systems and methods for identifying and preventing the proliferation of network threats on a network. All such modifications and variations are within the scope of the appended claims when interpreted in accordance with the breadth to which they are fairly and legally entitled.

What is claimed is:

1. A method for identifying a network threat, comprising:
   assembling a set of names of files responsible for proliferating a network threat and a set of names of files previously identified as not responsible for proliferating a network threat;
   inserting a network traffic monitor within a network service provider's infrastructure, the network traffic monitor configured to identify a first domain responsible for presently communicating at least one file from the set of names of files responsible for proliferating a network threat;
   searching the first domain for files not associated with either of the set of names of files responsible for proliferating a network threat and the set of names of files previously identified as not responsible for proliferating a network threat;
   analyzing the content of the files not associated with either of the set of names of files responsible for proliferating a network threat and the set of names of files previously identified as not responsible for proliferating a network threat; and
   adding a file name to one of the set of names of files responsible for proliferating a network threat and the set of names of files previously identified as not responsible for proliferating a network threat responsive to the step of analyzing.

2. The method of claim 1, further comprising:
   searching the first domain for links to a second domain other than the first domain;
   searching the second domain for files not associated with either of the set of names of files responsible for proliferating a network threat and the set of names of files previously identified as not responsible for proliferating a network threat;
   analyzing the content of the files from the second domain not associated with either of the set of names of files responsible for proliferating a network threat and the set of names of files previously identified as not responsible for proliferating a network threat;
   adding a file name to one of the set of names of files responsible for proliferating a network threat and the set of names of files previously identified as not responsible for proliferating a network threat responsive to the step of analyzing the content of files from the second domain; and
   updating a set of domain names that contain at least one file from the set of names of files responsible for proliferating a network threat.

3. The method of claim 2, wherein analyzing the content of files comprises assigning a tag selected from the group of known threat, unknown, and no threat in response to the collection of files.

4. The method of claim 3, further comprising:
   providing files with the unknown tag to an automated screen configured to determine if each respective file when executed produces a behavior indicative of a threat to network communications, a computing device coupled to the network and data exposed via the network.

5. The method of claim 4, further comprising:
   generating a removal routine responsive to a file that when executed produces a behavior indicative of a threat.

6. The method of claim 1, further comprising:
forwarding files not associated with either of the set of names of files responsible for proliferating a network threat and the set of names of files previously identified as not responsible for proliferating a network threat to a data store prior to analyzing the files.

7. The method of claim 6, wherein forwarding files not associated with either of the set of names of files responsible for proliferating a network threat and the set of names of files previously identified as not responsible for proliferating a network threat to a data store comprises generating and associating a digest with each respective file.

8. The method of claim 7, wherein the digest is used to distinguish the contents of a select file from all other files including previous versions of the select file.

9. The method of claim 1, further comprising:
deriving an original digest for each file associated with the first domain; and
periodically comparing the original digest for each file with a subsequently derived digest to identify when a file has been modified.

10. The method of claim 9, further comprising:
analyzing a file that has been modified to determine if an original classification associated with the file should be changed.

11. The method of claim 10, wherein analyzing a file that has been modified comprises applying a screen configured to determine if the file, when executed, produces a behavior indicative of a threat.

12. The method of claim 11, further comprising:
generating a removal routine responsive to a file that when executed produces a behavior indicative of a threat.

13. A system for identifying a network threat, comprising:
a network traffic monitor that receives a copy of traffic that traverses a network service provider's infrastructure to identify a first domain responsible for communicating previously identified network threats;
a crawler coupled to the network traffic monitor that traverses the first domain by following links on pages presented by the first domain to identify a new file that is not a member of a set of previously identified files that proliferate threats and not a member of a set of previously identified files that do not proliferate threats;
a data store communicatively coupled to the network traffic monitor and the crawler, the data store configured to hold a collection of files comprising the set of previously identified files that proliferate threats and a set of previously identified files that do not proliferate known threats, the new file, and an identifier associated with each of the first domain and the second domain; and
an analyzer coupled to the data store that examines the execution behavior of the new file and in response thereto classifies and returns the new file to be stored in the data store with one of the set of files that do not proliferate threats or the set of files that proliferate threats.

14. The system of claim 13, wherein the network traffic monitor is coupled to a router under the control of an Internet service provider.

15. The system of claim 13, wherein the network traffic monitor forwards a uniform resource locator to the data store.

16. The system of claim 13, wherein the network traffic monitor forwards a digest responsive to a portion of the traffic to the data store.

17. The system of claim 13, wherein the crawler is configured to identify when the contents of a file on the first domain have changed.

18. The system of claim 17, wherein the crawler forwards a file identifier to the data store.

19. The system of claim 13, wherein the analyzer is configured to generate a communication responsive to the new file.

20. The system of claim 13, further comprising:
a server coupled to the Internet and configured to receive information responsive to the new file.

* * * * *